(12) United States Patent
Lee

(10) Patent No.: US 8,875,110 B2
(45) Date of Patent: Oct. 28, 2014

(54) CODE INSPECTION EXECUTING SYSTEM FOR PERFORMING A CODE INSPECTION OF ABAP SOURCE CODES

(75) Inventor: Heon Ki Lee, Seoul (KR)

(73) Assignee: Soft4soft Co., Ltd., Daejeon (KR)

( * ) Notice: Subject to any disclaimer, the term of this patent is extended or adjusted under 35 U.S.C. 154(b) by 118 days.

(21) Appl. No.: 13/634,751

(22) PCT Filed: Apr. 5, 2010

(86) PCT No.: PCT/KR2010/002061
§ 371 (c)(1),
(2), (4) Date: Sep. 13, 2012

(87) PCT Pub. No.: WO2011/122724
PCT Pub. Date: Oct. 6, 2011

(65) Prior Publication Data
US 2013/0014093 A1 Jan. 10, 2013

(30) Foreign Application Priority Data
Mar. 29, 2010 (KR) ........................ 10-2010-0028128

(51) Int. Cl.
*G06F 9/45* (2006.01)
*G06F 11/36* (2006.01)
*G06F 9/44* (2006.01)
(52) U.S. Cl.
CPC .............. *G06F 11/3604* (2013.01); *G06F 8/75* (2013.01)
USPC ............................ 717/142; 717/143; 717/144
(58) Field of Classification Search
CPC ........................................................ G06F 8/42
USPC .......................................... 717/142, 143, 144
See application file for complete search history.

(56) References Cited

U.S. PATENT DOCUMENTS

| 6,873,935 | B2 |   | 3/2005  | Spinrad et al. |
|-----------|----|---|---------|----------------|
| 7,958,493 | B2 | * | 6/2011  | Lindsey et al. ............... 717/117 |
| 8,572,566 | B2 | * | 10/2013 | Gass et al. ..................... 717/121 |
| 2007/0234288 | A1 | * | 10/2007 | Lindsey et al. ............... 717/117 |
| 2008/0196012 | A1 | * | 8/2008  | Cohen et al. .................. 717/125 |
| 2010/0153933 | A1 | * | 6/2010  | Bohlmann et al. ............ 717/144 |
| 2011/0067006 | A1 | * | 3/2011  | Baker et al. ................... 717/127 |
| 2012/0099835 | A1 | * | 4/2012  | Fu et al. ....................... 386/230 |

FOREIGN PATENT DOCUMENTS

| JP | 2007-052625 A | 3/2007 |
| JP | 2009-211503 A | 9/2009 |
| KR | 10-0501936 B1 | 7/2005 |
| KR | 10-2009-0028368 A | 3/2009 |
| KR | 10-2009-0028366 A | 3/2012 |

OTHER PUBLICATIONS

Alfred et al., "Compilers—Principles, Techniques, & Tools", 2007.*

* cited by examiner

*Primary Examiner* — Phillip H Nguyen
(74) *Attorney, Agent, or Firm* — Rabin & Berdo, P.C.

(57) ABSTRACT

The present invention relates to a code inspection executing system for performing a code inspection of ABAP source codes, and particularly, to a code inspection executing system for performing a code inspection of ABAP source codes, which provides the reliable maintainability, performance, accuracy, stability, and security of an ABAP application by inspecting coding defects such as system failure and stoppage, data loss and transformation, excessive performance deterioration, erroneous behavior of functions and results thereof, complex code structures, and spelling errors.

5 Claims, 14 Drawing Sheets

```
1  REPORT Z_ABAP_Samples.
2
3
4  CLASS Foo DEFINITION.
5
6    PUBLIC SECTION.
7      METHODS doCount.
8    PRIVATE SECTION.
9      DATA count TYPE i VALUE 0.
10     DATA sum TYPE i VALUE 0.
11 ENDCLASS.
12
13 CLASS Foo IMPLEMENTATION.
14 METHOD doCount.
15
16     FIELD-SYMBOLS : <fs1> type any.  "Violation : shall be initialized.
17
18     DATA j TYPE i  value 0.
19     DATA : tp_value TYPE string value 'sample here'.
20     DATA : tp_fieldname TYPE string value 'tp_value'.
21
22     IF <fs1> is ASSIGNED.
23       write / 'assigned'.
24     ELSE.
25       write / 'unassinged'.
26     ENDIF.
27
28     WRITE <fs1>.
29
30     doCount().   "Violation : shall not be recursive.
31
32     DO.    "Violation : shall be exited from loops.
33        count = count + 1.
34        IF sum > 10.
35           sum = count /j. "Violation  : shall not be divided by zero.
36        ENDIF.
37     ENDDO.
38
39 ENDMETHOD.
```

CODE INSPECTION EXECUTING SYSTEM FOR PERFORMING A CODE INSPECTION OF ABAP SOURCE CODES

TECHNICAL FIELD

The present invention relates to a code inspection executing system for performing a code inspection of ABAP source codes, more particularly to a code inspection executing system for performing a code inspection of ABAP source codes, which provides the reliable maintainability, performance, accuracy, stability, and security of an ABAP application by inspecting coding defects such as system failure and stoppage, data loss and transformation, excessive performance deterioration, erroneous behavior of functions and results thereof, complex code structures, and spelling errors generated by the misunderstanding of the ABAP developer on the ABAP language and SAP R/3, the wrong use thereof, and the mistake thereof etc. without limitation of the standardized case sensitive and the coding format on an ABAP programming, while the ABAP/4 language made by the Germany SAP company is the fourth generation language for developing the enterprise resource planning package system (ERP) etc. based on a SAP R/3 as a client-server environment.

BACKGROUND ART

In a method for inspecting various code defects included in the ABAP software, there are a code inspection of detecting the code defects, which can be generated in the actual execution, in advance through a static analysis of only the source code and a testing technique of finding out the code defects based on the result values according to the execution of the source code.

The code inspection technique serves to remove the code defects prior to the test thereof, so that it shortens the development period and reduces the cost and period of the testing. Also, since it can reduce the maintenance cost owing to the development of the consistent coding format base application, particularly the code inspection technique is efficient.

In the conventional ABAP inspection, there are a method of manually examining the code defects next to the code development (after the compiling) and a code profiler, which is the testing technique of finding out a security vulnerability in real time through the execution of the program. However, the code is not executed in the code development step (before compiling). Also, it cannot detect the codes against the reliable maintainability, performance, accuracy, stability, and security of an ABAP application with only the ABAP code itself.

DISCLOSURE

Technical Problem

Therefore, the present invention has been made in view of the above-mentioned problems, and an object of the present invention is to provide a code inspection executing system for performing a code inspection of ABAP source codes capable of constituting tree data structure of an abstract syntax tree by analyzing the ABAP source codes in terms of vocabulary and syntax according to an ABAP grammar (BNF) defined in advance and establishing a table data structure of a symbol table by semantically analyzing it in the abstract syntax tree.

Another object of the present invention is to provide a code inspection executing system for performing a code inspection of ABAP source codes in that a source code defect inspection of an ABAP code inspection tool serves to inspect the defects of the source codes related to various coding rules based on the established table and tree data structure as described above.

Technical Solution

In accordance with the present invention to achieve the object thereof, there is provided a code inspection executing system for performing the code inspection of ABAP source codes according to the present invention includes an ABAP source codes grammar analyzer for analyzing the ABAP source codes as an abject of code inspection in terms of vocabulary, syntax, and signification thereof and storing analysis results in an abstract syntax tree and a data structure of a symbol table; and an ABAP source codes defect checker for generating a code defect report in order to check a code defect of a source code and a grammar structure related to coding rules selected in an ABAP rule managing module in a program path analyzing module on the basis of the data structure and modify a violated code defect.

Advantageous Effects

According to the code inspection executing system for performing the code inspection of the ABAP source codes, there is an effect in that various code defects included in the ABAP software can be static-analyzed through only the source codes, thereby detecting the code defects, which can be generated in the actual execution, in advance.

Also, there are other effects in that the inspecting coding defects such as system failure and stoppage, data loss and transformation, excessive performance deterioration, erroneous behavior of functions and results thereof, complex code structures, and spelling errors generated by the misunderstanding of the ABAP developer on the ABAP language and SAP R/3, the wrong use thereof, and the mistake thereof etc. can be eliminated prior to the testing, so that the development period thereof can be shortened, the cost and period of the testing can be reduced, and the maintenance cost can be reduced owing to the development of the consistent coding format base application.

BRIEF DESCRIPTION OF THE DRAWINGS

The foregoing and other objects, features and advantages of the present invention will become more apparent from the following detailed description when taken in conjunction with the accompanying drawings in which:

FIG. 4 is an example view illustrating the ABAP source codes as the inspection object of the code inspection executing system for performing the code inspection of the ABAP source codes according to a preferred embodiment of the present invention;

FIG. 13 is an example view illustrating a screen of a code defect report, after execution of the code inspection of control and data flow path patterns of the code inspection executing system for performing the code inspection of the ABAP source codes according to a preferred embodiment of the present invention; and FIG. 14 is an example view illustrating a screen of a code defect report, after execution of the code inspection of control flow and call path patterns of the code inspection executing system for performing the code inspection of the ABAP source codes according to a preferred embodiment of the present invention.

DESCRIPTIONS ON REFERENCE NUMBERS FOR THE MAJOR COMPONENTS IN THE DRAWINGS

Figure 1:
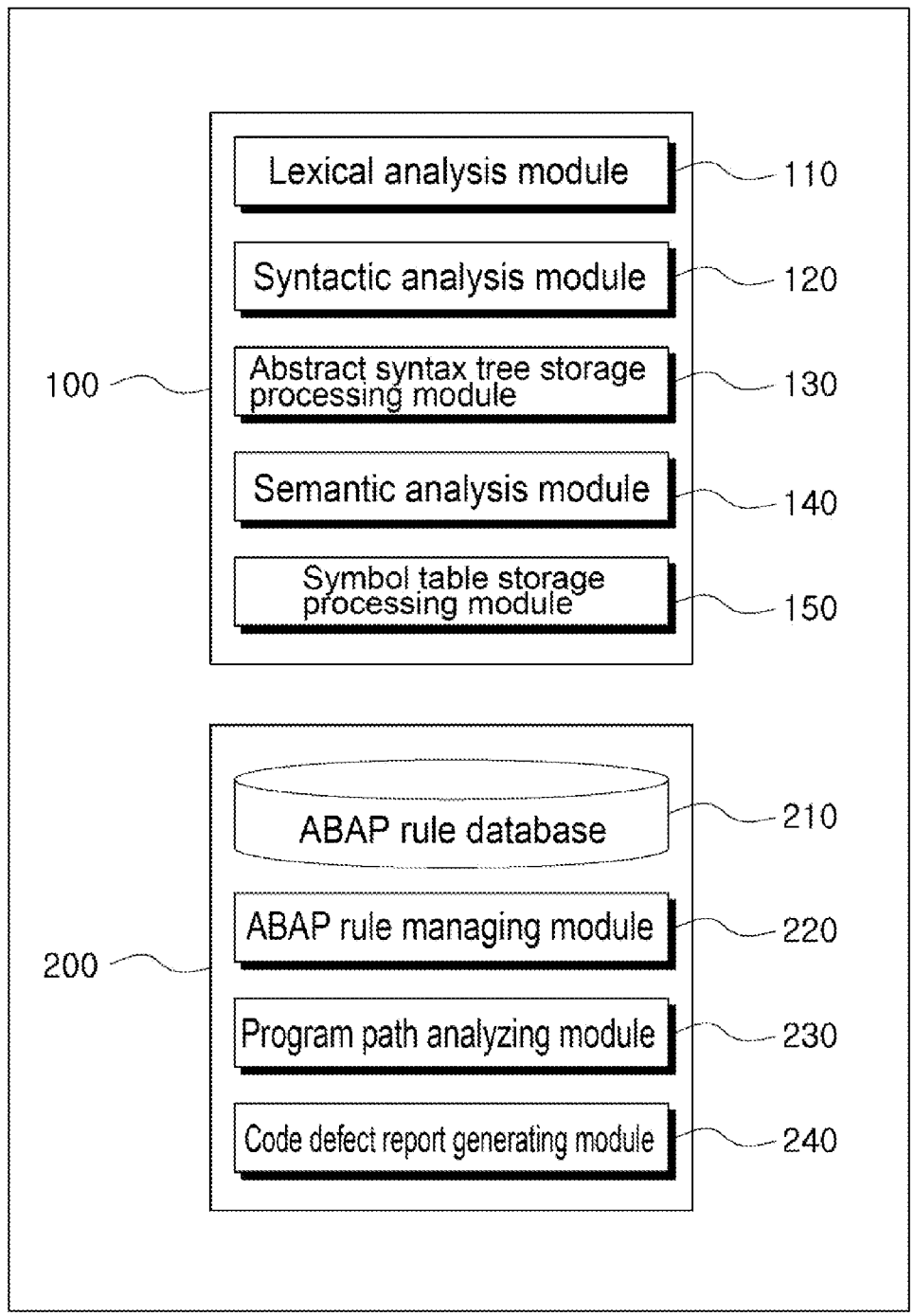
FIG. 1 is a whole block diagram of a code inspection executing system for performing a code inspection of ABAP source codes according to a preferred embodiment of the present invention.

110: lexical analysis module
120: syntactic analysis module
130: abstract syntax tree storage processing module
140: semantic analysis module
150: symbol table storage processing module
210: ABAP rule database
220: ABAP rule managing module
230: program path analyzing module
240: code defect report generating module

BEST MODE

Mode for Invention

In accordance with the present invention to achieve the object thereof, there is provided a code inspection executing system for performing the code inspection of ABAP source codes according to the present invention includes an ABAP source codes grammar analyzer for analyzing the ABAP source codes as an abject of code inspection in terms of vocabulary, syntax, and signification thereof and storing analysis results in an abstract syntax tree and a data structure of a symbol table; and an ABAP source codes defect checker for generating a code defect report in order to check a code defect of a source code and a grammar structure related to coding rules selected in an ABAP rule managing module in a program path analyzing module on the basis of the data structure and modify a violated code defect.

At this time, the ABAP source codes grammar analyzer includes a lexical analysis module for reading the ABAP source codes files as the abject of code inspection in the file unit and separating the ABAP source codes in the token unit (keyword, identifier, symbol identifier, constant, operator) of meaning a series of character string according to an ABAP grammar (BNF) defined in advance;

a syntactic analysis module for inspecting whether the syntax (grammar) of the tokens separated in each file unit is in contravention of the ABAP grammar defined in advance, generating a grammar error message of the related file if it has the grammar error, and analyzing syntaxes of the sentence if there is no grammar error, whereby endowing the meaning of a control flow relation between syntaxes and extracting syntax structures of each file unit;

an abstract syntax tree storage processing module for storing the information extracted from the syntactic analysis module in the tree data structure by each file unit;

a semantic analysis module for extracting symbol patterns (class, method, variable, type, function, event, dialog, processing block) of constituting each file on the abstract syntax tree storage processing module, a connection relation information between them, and defective pattern structures of each symbol necessary for the defective inspection; and a symbol table storage processing module for storing the information extracted from the semantic analysis module in the table data structure of the symbols, which are elements of each file.

At this time, the ABAP source codes defect checker includes an ABAP rule database for storing and managing various coding rules categories (ABAP and SQL coding style, coding standard, architecture standard, SQL standard, runtime error, security vulnerability), the symbol patterns of each rule, the defective pattern structure type, and the fault condition types according to the defect severity and the programming characteristic through the ABAP rule managing module;

the ABAP rule managing module for selecting the coding rules from the ABAP rule database, searching symbol values of the symbol table corresponding to the symbol and the defective pattern structure related to the selected rules by each file, extracting all grammatical structures and the source code corresponding to the searched symbol values from the abstract construction tree, and transmitting them to the program path analyzing module;

the program path analyzing module for inspecting the grammatical structures and the source code of the extracted each symbol value according to the program path pattern (control flow, control and data flow, or control flow and call) of the selected rules, the defective pattern structures, and the fault condition; and a code defect report generating module for generating a code defect report if the selected code rule has a violated defect.

Here, the ABAP source codes grammar analyzer serves to receive the syntax-analyzed tokens in each file unit, analyze a grammar structure of the tokens through a LR(1) parser algorithm, which is a bottom-up syntax analysis, and extracting a control flow relation between the syntax structures in each file unit to be stored in the data structure of the abstract syntax tree.

At this time, the ABAP source codes grammar analyzer serves to extract symbol patterns of constituting each file, a symbol connection relation between them, a type information, and a name connection relation and store the defective pattern structures of each symbol necessary for the defective inspection in the table data structure of the symbols.

Also, in the ABAP source codes grammar analyzer, if it selects an upper directory having the ABAP file (*.abap) during an analysis of the ABAP source codes, all ABAP files including a lower directory become the object of inspection, or if it selects one file, it becomes the object of inspection.

Here, the program path analyzing module serves to identify the code defects of the related coding rules in the grammatical structures and the source code of each symbol value extracted from the ABAP rule managing module according to the program path pattern of the rules defined in the ABAP rule database, the defective pattern structures, and the fault condition.

At this time, the ABAP rule managing module serves to select each individual category coding rules from the ABAP rule database, set up detail options, search symbol values of the symbol table corresponding to the symbol and the defective pattern structure related to the selected rules by each file, extract all grammatical structures and the source code corresponding to the searched symbol values from the abstract construction tree, and transmit them to the program path analyzing module.

Also, the ABAP rule database is a database for storing coding rules of various categories (ABAP and SQL coding style, coding standard, architecture standard, SQL standard, run-time error, and security vulnerability, includes data structures of the category type of each rule, symbol pattern, program path pattern, defective pattern structure type, fault condition, rule name, rule ID, error type, and error message, and serves to manage an addition or a change of the rules through the ABAP rule managing module.

Hereinafter, exemplary embodiments of the present invention will be described in detail with reference to the accompanying drawings.

FIG. 1 is a whole block diagram of a code inspection executing system for performing a code inspection of ABAP source codes according to a preferred embodiment of the present invention.

As shown in FIG. 1, the code inspection executing system for performing the code inspection of ABAP source codes according to the present invention includes an ABAP source codes grammar analyzer 100 for analyzing the ABAP source codes as an abject of code inspection in terms of vocabulary, syntax, and signification thereof and storing analysis results in an abstract syntax tree and a data structure of a symbol table and an ABAP source codes defect checker 200 for generating a code defect report in order to check a code defect of a source code and a grammar structure related to coding rules selected in an ABAP rule managing module 220 in a program path analyzing module 230 on the basis of the data structure and modify a violated code defect.

At this time, the ABAP source codes grammar analyzer 100 includes a lexical analysis module for reading the ABAP source codes files as the abject of code inspection in the file unit and separating the ABAP source codes in the token unit (keyword, identifier, symbol identifier, constant, operator) of meaning a series of character string according to an ABAP grammar (BNF) defined in advance;

a syntactic analysis module 120 for inspecting whether the syntax (grammar) of the tokens separated in each file unit is in contravention of the ABAP grammar defined in advance, generating a grammar error message of the related file if it has the grammar error, and analyzing syntaxes of the sentence if there is no grammar error, whereby endowing the meaning of a control flow relation between syntaxes and extracting syntax structures of each file unit;

an abstract syntax tree storage processing module 130 for storing the information extracted from the syntactic analysis module in the tree data structure by each file unit;

a semantic analysis module 140 for extracting symbol patterns (class, method, variable, type, function, event, dialog, processing block) of constituting each file on the abstract syntax tree storage processing module, a connection relation information between them, and defective pattern structures of each symbol necessary for the defective inspection; and a symbol table storage processing module 150 for storing the information extracted from the semantic analysis module in the table data structure of the symbols, which are elements of each file.

At this time, the ABAP source codes defect checker 200 includes an ABAP rule database 210 for storing and managing various coding rules categories (ABAP and SQL coding style, coding standard, architecture standard, SQL standard, run-time error, security vulnerability), the symbol patterns of each rule, the defective pattern structure type, and the fault condition types according to the defect severity and the programming characteristic through the ABAP rule managing module;

the ABAP rule managing module 220 for selecting the coding rules from the ABAP rule database, searching symbol values of the symbol table corresponding to the symbol and the defective pattern structure related to the selected rules by each file, extracting all grammatical structures and the source code corresponding to the searched symbol values from the abstract construction tree, and transmitting them to the program path analyzing module;

the program path analyzing module 230 for inspecting the grammatical structures and the source code of the extracted each symbol value according to the program path pattern (control flow, control and data flow, or control flow and call) of the selected rules, the defective pattern structures, and the fault condition; and a code defect report generating module 240 for generating a code defect report if the selected code rule has a violated defect.

That is, the code inspection executing system of the present invention is divided into the ABAP source codes grammar analyzer for analyzing the ABAP source codes as an abject of code inspection in terms of vocabulary, syntax, and signification thereof and storing analysis results in an abstract syntax tree and a data structure of a symbol table and an ABAP source codes defect checker for generating a code defect report in order to check a code defect of a source code and a grammar structure related to coding rules selected in an ABAP rule managing module in a program path analyzing module on the basis of the data structure and modify a violated code defect.

The function of the ABAP source codes grammar analyzer is as follows.

Figure 3:
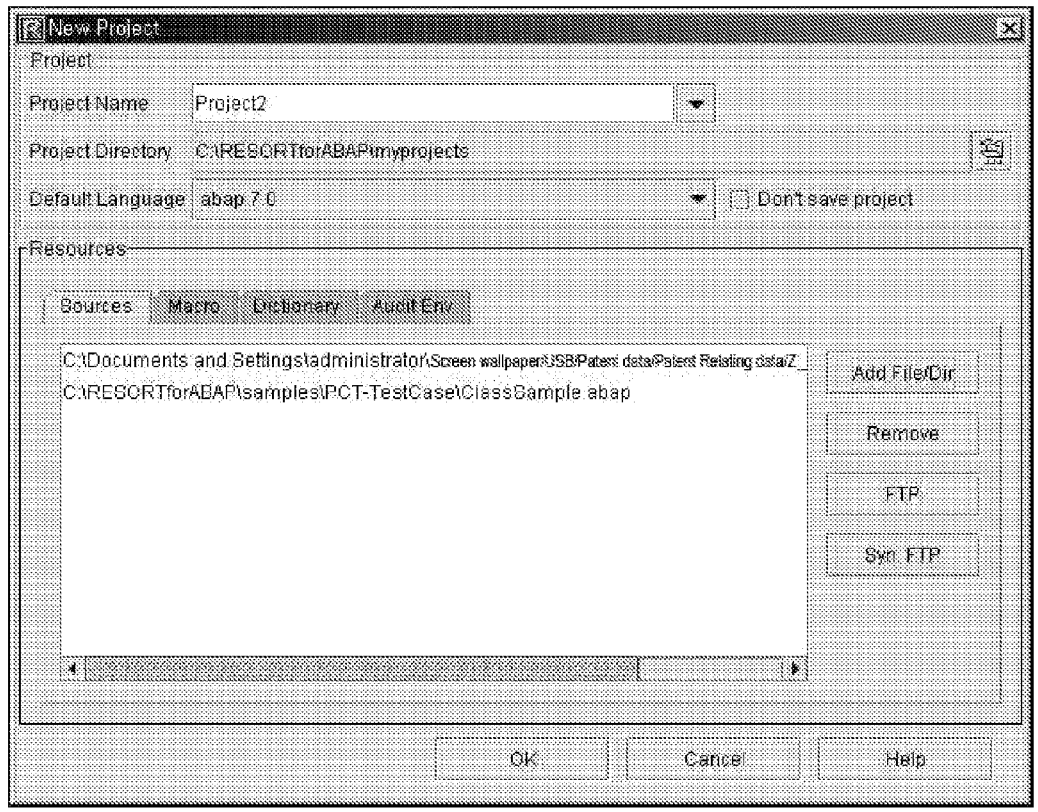
FIG. 3 is an example view illustrating a screen of selecting the ABAP source codes as an inspection object of the code inspection executing system for performing the code inspection of the ABAP source codes according to a preferred embodiment of the present invention.

As shown in FIG. 3, if the user selects an upper directory having the ABAP file (*.abap) illustrated in FIG. 4, all ABAP files including the lower directory become the object of inspection. Or, if the user selects one file as shown in the example ABAP file of FIG. 4, it becomes the object of inspection. Then, it reads the selected files and sets up the index. Continuously, all ABAP source code as the object of inspection are transmitted to the lexical analysis module 110 in index order.

For reference, the line number of the left of FIG. 4 conveniently records.

At this time, the lexical analysis module 110 serves to read the ABAP source codes files as the abject of code inspection as shown in the example source of FIG. 4 in the file unit and separate the ABAP source codes in the token unit of meaning a series of character string according to an ABAP Backus Normal Form (BNF) of the ABAP grammar defined in advance to be transmitted to the syntactic analysis module 120.

In order to perform the above function, the token of the lexical analysis module points out the primary language element which it grammatically cannot be divided any more. Also, it is classified into the symbol of the keyword, identifier, symbol-identifier, constant, operator, thereby giving to each token.

Figure 5:
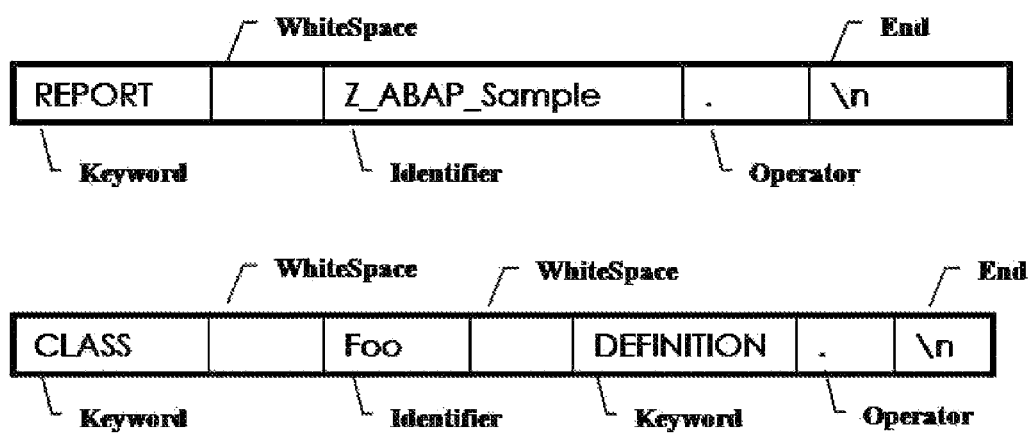
FIG. 5 is an example view illustrating a lexical analysis module of the code inspection executing system for performing the code inspection of the ABAP source codes according to a preferred embodiment of the present invention.

As shown in FIG. 5, the sentences of the inputted first and fourth line of FIG. 4 are converted into the token called as the character string and it gives the symbol of token according to each token.

However, an End, a blank, and an annotation are not the token in FIG. 5.

As illustrated in the example of FIG. 5, the syntactic analysis module 120 serves to receive the syntax-analyzed token in each file unit and inspect whether the syntax of the tokens is in contravention of the ABAP grammar (BNF) defined in advance. If it has the grammar error, the grammar error message of the related file is notified as an ABAP grammar error message. Also, if there is no grammar error, it serves to analyze the grammar structure of the tokens through a LR(1) parser algorithm, which is a bottom-up syntax analysis, thereby extracting the control flow relation between the syntax structures in each file unit. Then, the information extracted from the syntactic analysis module is stored in the data structure of the abstract syntax tree by process of the abstract syntax tree storage processing module 130 and the generated grammar structure information of the abstract construction tree is transmitted to the semantic analysis module 140 in each file unit.

Figure 6:
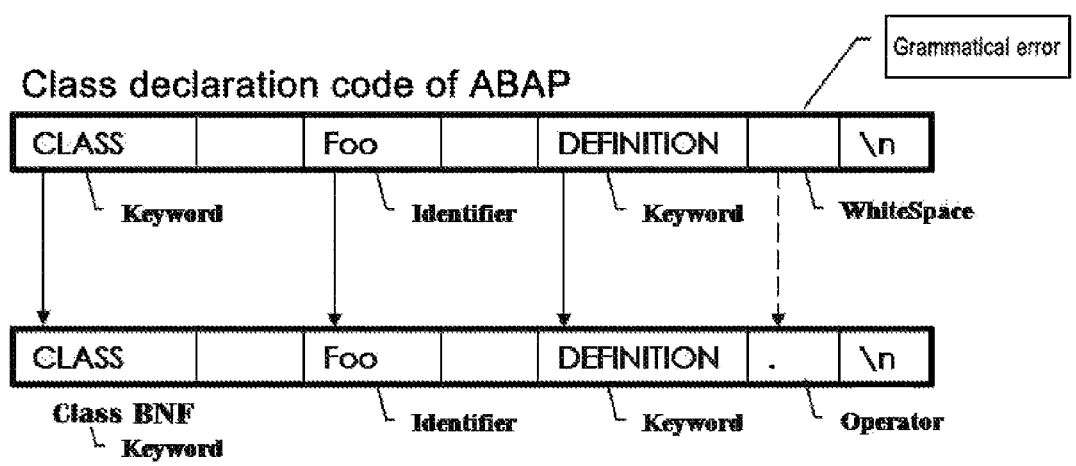
FIG. 6 is an example view illustrating a syntactic analysis module of the code inspection executing system for performing the code inspection of the ABAP source codes according to a preferred embodiment of the present invention.

As shown in FIG. 6 as an example of the grammar inspection, it checks out whether there is grammatical error against the class BNF in the class declarative sentence of fourth line of FIG. 4.

Additionally, the end of one sentence of all ABAPs should have a finalizer of "." operator at all times.

Figure 10:
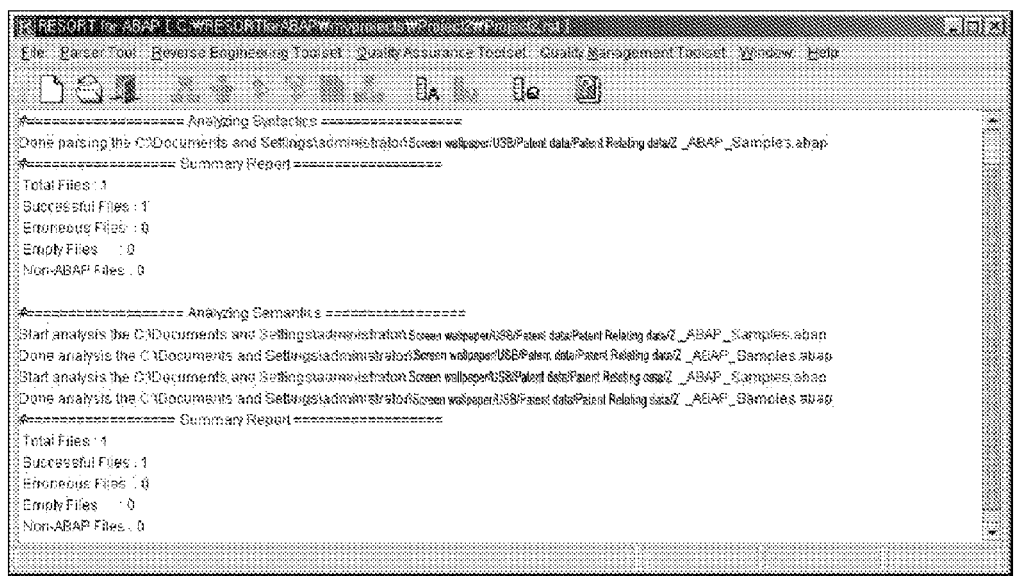
FIG. 10 is a screenshot of the display for executing the syntax and semantic analysis of the code inspection executing system for performing the code inspection of the ABAP source codes according to a preferred embodiment of the present invention.

As shown in FIG. 10, in case of the files against the ABAP grammar, it indicates the number and the error location of the erroneous files and excludes from the semantic object.

Figure 8:
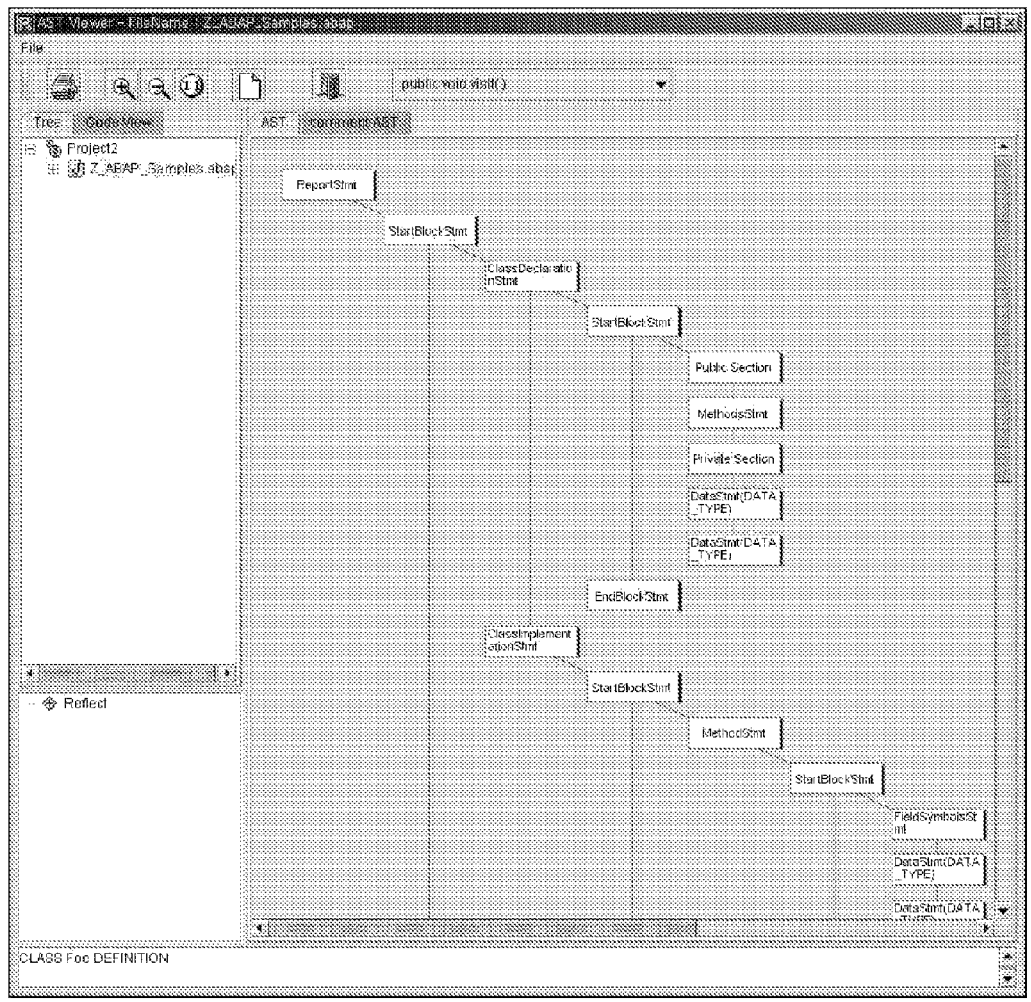
FIG. 8 is an example view illustrating the abstract syntax tree of the code inspection executing system for performing the code inspection of the ABAP source codes according to a preferred embodiment of the present invention.

As an example of the generation of the abstract syntax tree, FIG. 8 illustrates a tree data structure generated by the syntax analysis of the example source of FIG. 4.

Figure 7:
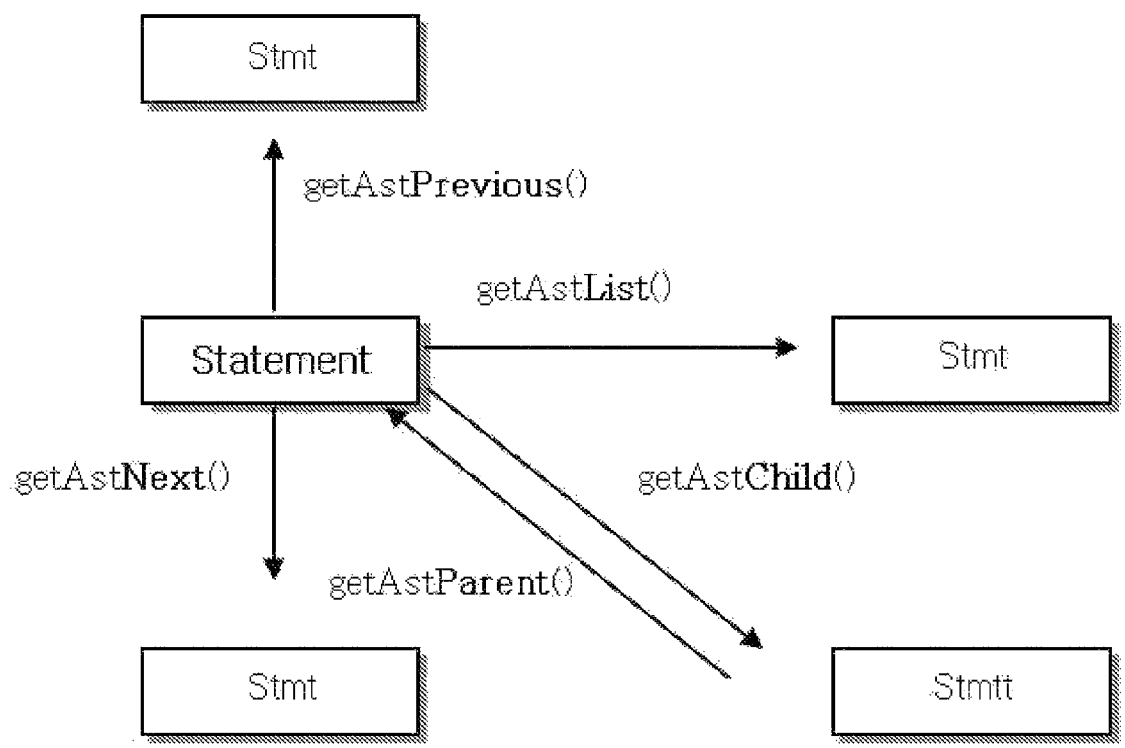
FIG. 7 is an example view illustrating a data structure of an abstract syntax tree of the code inspection executing system for performing the code inspection of the ABAP source codes according to a preferred embodiment of the present invention.

Referring to FIG. 7, in the data structure of the abstract syntax tree as described above, each node of each file illustrates the sentence (Statement) of a semantic one unit. Each statement includes data structures having a physical location (ID) of the source, an expression (grammatical structure and source code), and connection relations between the statements (father node (node prior to its own node depth), child node (node next to its own node depth), next node (node having the same depth as its own node depth), previous node (node having the same depth as its own node depth), and a list node (node having the same depth as its own node depth and existed in the identical source line.

As shown in FIG. 8, in the connection relation between the nodes, the control flow between the nodes is schematized through a directivity graph. The link of the control flow between the nodes is illustrated in each node. Also, the node without the next node exhibits the end of the statement.

As shown in the abstract syntax tree of FIG. 8, the semantic analysis module 140 serves to extract the symbol patterns of constituting each file, the symbol connection relation between them, the type information, and the name connection relation and store the defective pattern structures of each symbol necessary for the defective inspection in the table data structure of the symbols by means of the symbol table storage processing module 150.

Also, in order to perform the coding rules selected in the ABAP rule managing module 220, the data structure of the symbol table is firstly searched.

As to the data structure of the symbol table as described above, it includes the class data structure having the subsystem, the file, the class, the method, the variable, the form, the function, the event, the dialog, and the processing block.

Figure 9:
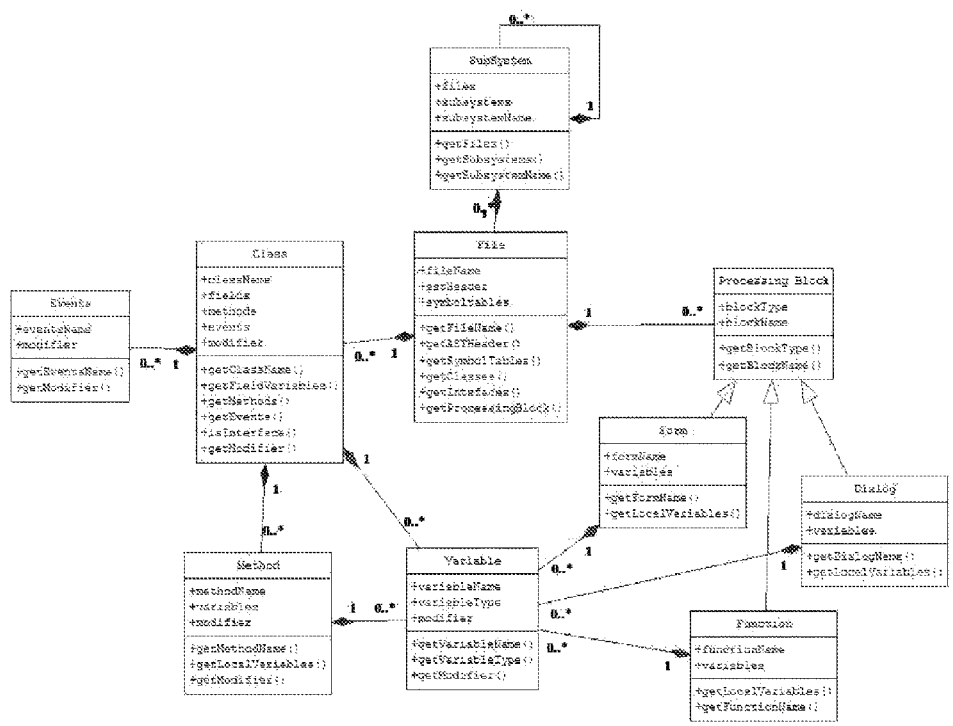
FIG. 9 is a class diagram of the symbol table data structure of the code inspection executing system for performing the code inspection of the ABAP source codes according to a preferred embodiment of the present invention.

FIG. 9 illustrates each class having the class-name, the attribute name, and the method name. Here, the connection line exhibits the relation between the classes.

The method serves to read the grammatical structure and the source code of each patterns of symbols from the abstract syntax tree.

Hereinafter, the ABAP source codes defect checker 200 will be concretely described.

Figure 11:
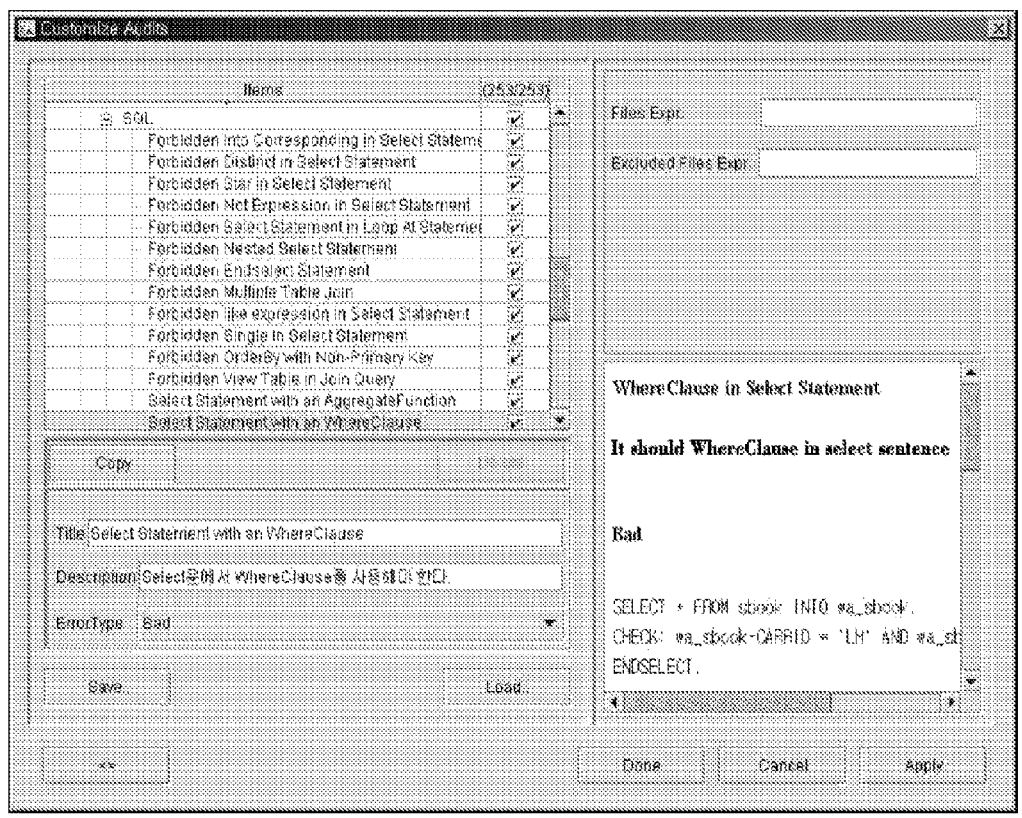
FIG. 11 is an example view illustrating a screen of selecting the coding rules of the code inspection executing system for performing the code inspection of the ABAP source codes according to a preferred embodiment of the present invention.

The ABAP rule database 210 is any database (DB) for storing various coding rules of six categories, as shown in FIG. 11. Here, the ABAP rule database 210 serves to manage the addition or the change of the rules etc. through the ABAP rule managing module 220.

As to the structure of the ABAP rule database, it includes the data structure of the category type, the symbol patterns, the program path pattern, the defective pattern structure type, the fault condition, the rule name, the rule ID, the error type, and the error message.

Also, the coding rules categories includes the ABAP and SQL coding style, the coding standard, the architecture standard, the SQL standard, the run-time error, and the security vulnerability.

The embodiment on the name and the explanation of each individual category coding rules are as follows.

(1) ABAP and SQL coding style.
Indentation (the indent has to be by unit)
Line Length (it has to be written within 100 per line)
Hard-Coding (it should not perform hard-coding)
(2) Coding standard.
Variable Naming (the variable naming rule has to be observed)
Recursive Calls (it should not perform recursive calls)
Form Obsolete Statements (it should not use form sentence)
(3) Architecture standard.
Return Value Testing on SQL Statement (it has to check out the error after the use of the SQL statement)
Forbidden External Subroutine Invocation (it should not call the subroutine of the other program)
Using Commit and Rollback on Try Block (the rollback work has to be described in the catch syntax if the commit work is described in the Try syntax)
(4) SQL standard.
Forbidden Nested Select Statement (it should not describe the multiple select sentence)

Forbidden Multiple Table Join (it should not join more than three Table)
Select Statement with an GroupBy Function (it should not use the groupby function during use of the Select syntax)
    (5) Runtime error.
Division by zero (it should not be divided by '0' during division operation)
Unassigned Field Symbol (it should initialize the Field symbol before use)
Infinite Loops (the exit code has to be certainly described in the loop statement preparation)
    (6) Security vulnerability.
Call of System Function (it should not use the system function)
Call of Transactions (it should not use the Call Transaction sentence)
Use of Database Hints (it should not use the hints syntax during use of the Select sentence)

As shown in FIG. 11, the ABAP rule managing module 220 serves to select each individual category coding rules from the ABAP rule database, set up detail options, search symbol values of the symbol table corresponding to the symbol and the defective pattern structure related to the selected rules by each file, extract all grammatical structures and the source code corresponding to the searched symbol values from the abstract construction tree, and transmit them to the program path analyzing module 230.

Figure 12:
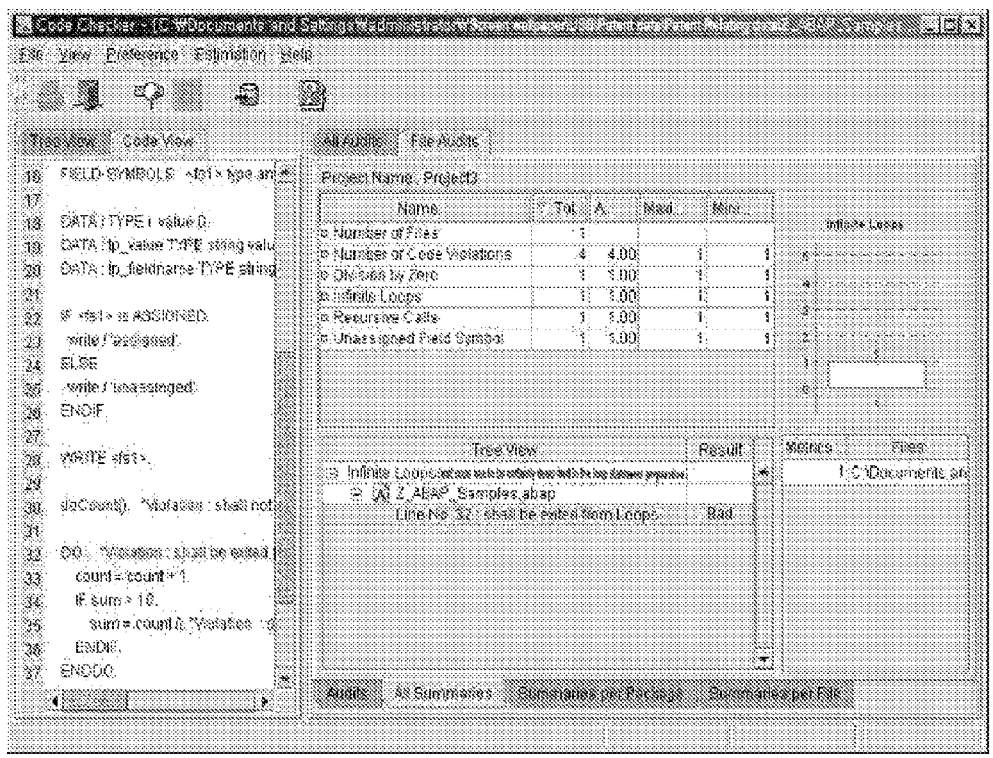
FIG. 12 is an example view illustrating a screen of a code defect report, after execution of the code inspection of a control flow path pattern of the code inspection executing system for performing the code inspection of the ABAP source codes according to a preferred embodiment of the present invention.
Figure 13:
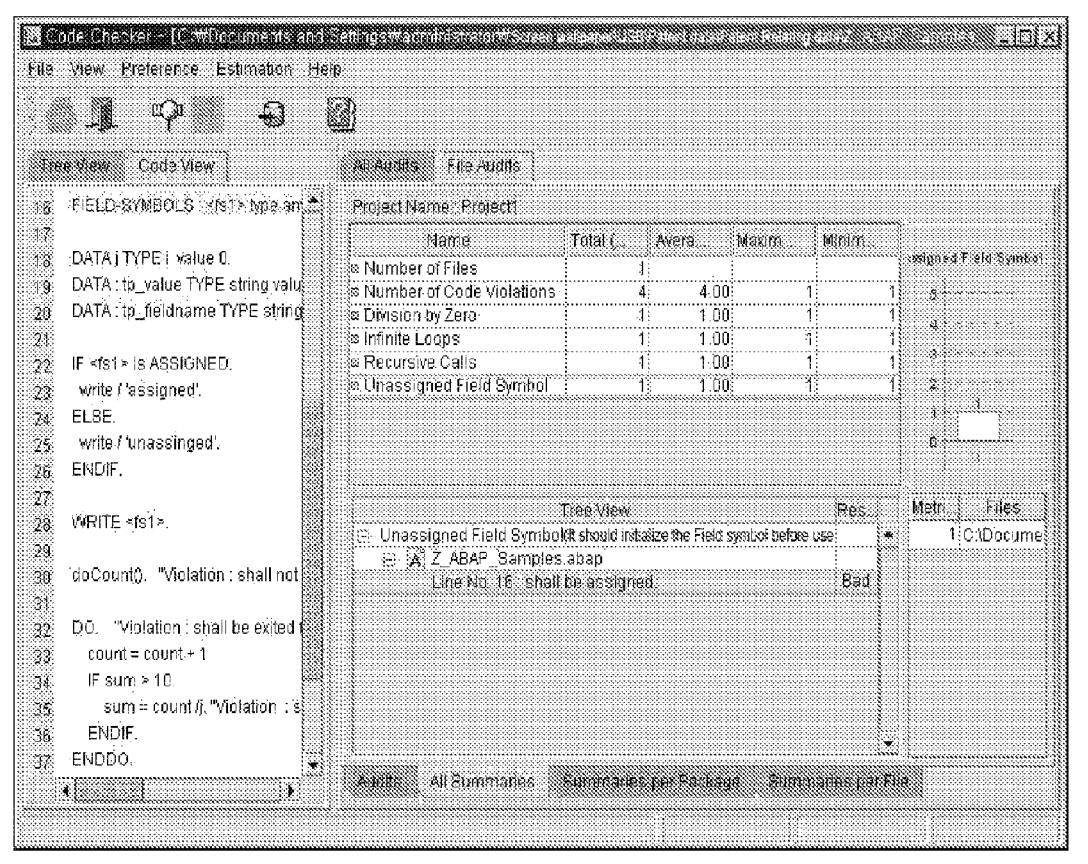
Figure 14:
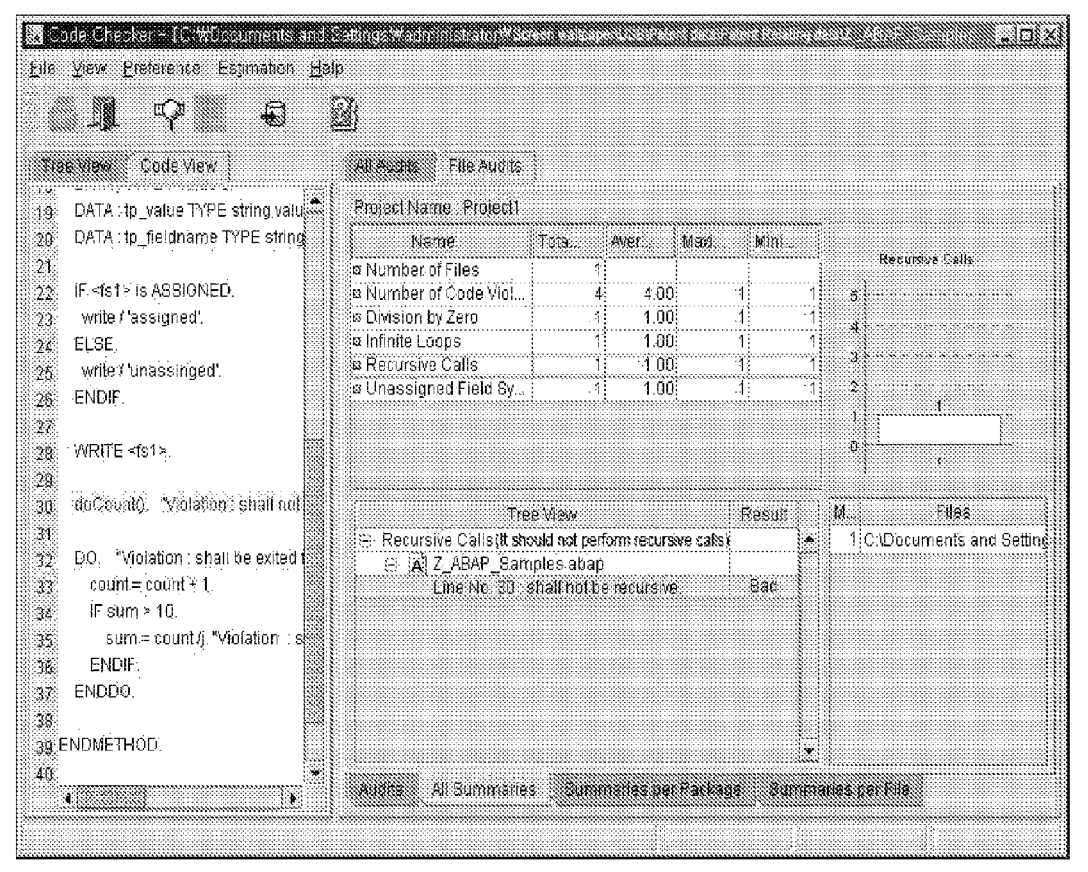

The program path analyzing module 230 serves to identify the code defects of the related coding rules in the grammatical structures and the source code of each symbol value extracted from the ABAP rule managing module 220 according to the program path pattern of the rules defined in the ABAP rule database 210, the defective pattern structures, and the fault condition. The detected defects are transmitted to the code defect report connected to the positions of each source code, thereby the information of the coding defects can be provided to the user as described above FIG. 12, FIG. 13 and FIG. 14.

The program path pattern of the program path analyzing module is classified into the control flow, the control and data flow, and the control flow and call in order to perform the function as described above. All coding rules defined in the ABAP rule database belong only to one program path pattern.

The embodiment of inspecting the defects in the program path analyzing module by means of each program path pattern is as follows:

(1) Defect inspection based on the program path pattern of the control flow (note FIG. 12)
Rule name and fault condition (the exit code has to be certainly described in the Infinite Loops during the loop statement preparation): ABAP rule database
Searching whether the loop statement is existed or not in the From symbol: ABAP rule managing module and symbol table
Reading the grammatical structure and the source code related to the From symbol: abstract syntax tree
Analyzing whether the Exit code is existed in the loop statement through the control flow path or not: the program path analyzing module
If there is no Exit code in the loop statement, it identifies the code defect, thereby generating the code defect report: the code defect report generating module
ABAP source example
FORM foo.
data i type i value 1.
data sum type i value 0.
do. "Violation: shall be exited from loops.
if sum>10.
sum=sum+i.
endif.
enddo.
ENDFORM.

(2) Defect inspection based on the program path pattern of the control and data flow (note FIG. 13)
Rule name and fault condition (it certainly has to initialize the Unassigned Field Symbol before use): ABAP rule database
Searching whether the Field-symbol is existed or not in the From symbol: ABAP rule managing module and symbol table
Reading the grammatical structure and the source code related to the From symbol: abstract syntax tree
Analyzing whether the Field-symbol existed in the sentence is initialized through the control and data flow path or not: the program path analyzing module
If it is not initialized in an initial sentence, it identifies the code defect, thereby generating the code defect report: the code defect report generating module
ABAP source example.
FORM foo.
FIELD-SYMBOLS:<fs1>type any. "Violation: shall be assigned.
data: tp_value type string value 'any value is acceptable
data: tp_fieldname type string value 'tp_value'.
if<fs1> is ASSIGNED.
write/'assigned'.
else.
write/'unassigned'.
endif.
write<fs1>.
ENDFORM.

(3) Defect inspection based on the program path pattern of the control flow and call (note FIG. 14)
Rule name and fault condition (it should not perform the Recursive Calls): ABAP rule database
Searching whether the Recursive Calls is existed or not in the Method symbol: ABAP rule managing module and symbol table
Reading the grammatical structure and the source code related to the Method symbol: abstract syntax tree
Analyzing whether the Method of calling itself is exited inside the Method through the control flow and call path or not: the program path analyzing module
If the Recursive Call is existed therein, it identifies the code defect, thereby generating the code defect report: the code defect report generating module
ABAP source example.
METHOD foo.
data i type i value 1.
data sum type i value 0.
write/'unassigned'.
foo( ) "Violation: shall not be recursive
ENDMETHOD.

Figure 2:
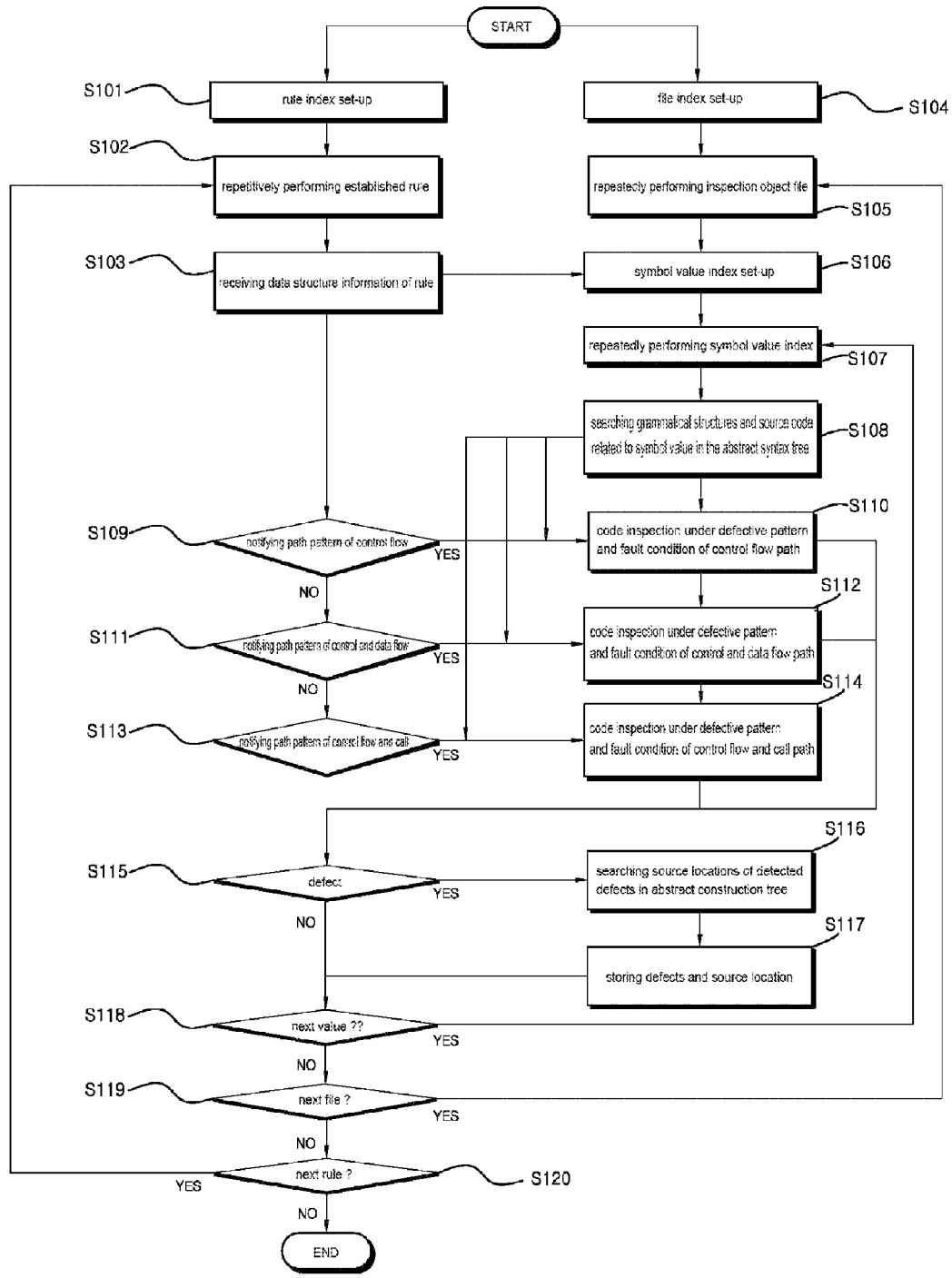
FIG. 2 is a flowchart showing the implementing method of the code inspection executing system for performing the code inspection of the ABAP source codes according to a preferred embodiment of the present invention.

FIG. 2 is a flowchart showing the implementing method of the code inspection executing system for performing the code inspection of the ABAP source codes according to a preferred embodiment of the present invention.

That is, FIG. 2 is a detailed process flow chart for producing the code defect report by performing the defect inspection on the selected rule among the rules of the ABAP and SQL coding style of the ABAP rule managing module, the coding standard, the architecture standard, the SQL standard, the run-time error, and the security vulnerability.

In the step S101, it sets up the rule index from the ABAP rules selected in the ABAP rule managing module of FIG. 1.

In the step S102, it repeatedly performs the code defect inspection on all files of the checking object from the step 103 to the step 119 according to the index order of the coding rules set up in the step S101. The above process is repetitively performed to the final of the rule index.

In the step S103, it receives the data structure information of the category type, the symbol pattern, the program path pattern, the defective pattern structure type, the fault condition, the rule name, the rule ID, the error type, and the error message on one rule of the step S102.

The received one program path pattern is transmitted to the step S109, S111 or the S113. The symbol pattern, the defective pattern structure type, and the fault condition are transmitted to the step S106.

In the step S104, it sets up the ABAP file index from the files searched in the file class of the symbol table.

In the step S105, it repeatedly performs the code defect inspection on all symbols of the checking object from the step 106 to the step 118 according to the ABAP file index order searched in the step S104. The above process is repetitively performed to the final of the file index.

In the step S106, it sets up the symbol value index by searching the values of the symbols, which are included in the files based on the information of the symbol pattern and the defective pattern structure type of one rule of the step S103 and one file name received from the step S105, in the symbol table.

In the step S107, it reads the value in the order of the symbol value index of the S106 and delivers to the step S108. In the S108, it searches all grammatical structures and the source code related to the symbol value in the abstract syntax tree. Also, the defective pattern structure type received from the step S103 is delivered to the step S110, S112 or the S114.

In the step S109, if the path pattern of the control flow is received from the S103, the step S110 notifies the result of the code inspection for the grammatical structure and source code of the symbol value, which are searched from the step S108, under the defective pattern structure type and the fault condition, which are received from the step S103, to the S115.

In the step S111, if the path pattern of the control and the data flow is received from the S103, the step S112 notifies the result of the code inspection for the grammatical structure and source code of the symbol value, which are searched from the step S108, under the defective pattern structure type and the fault condition, which are received from the step S103, to the S115.

In the step S113, if the path pattern of the control flow and the call is received from the S103, the step S114 notifies the result of the code inspection for the grammatical structure and source code of the symbol value, which are searched from the step S108, under the defective pattern structure type and the fault condition, which are received from the step S103, to the S115.

In the step S115, if the source code of the inspected symbol value has the defect, it delivers to the step S116. It moves to the S118 if there is no defect.

In the step S116, the source locations of each defect are searched in the physical location (ID) of the abstract construction tree and it delivers them to the step S117.

In the step S117, it stores the defects and the source location delivered from the step S116 and moves to the step S118.

In the step S118, if the next symbol value is existed in the symbol value index of the step S106, it moves to the step S107. If the next symbol value is not existed, it moves to the step S119 for the code inspection of the next file.

In the step S119, if the next file is existed in the file index of the step S104, it moves to the step S105. If the next file is not existed, it moves to the step S120 in order to apply the next rule.

In the step S120, if the next rule is existed in the rule index of the step S101, it moves to the step S102. If the next rule is not existed, it ends the code defect inspection thereof.

As described above, various code defects included in the ABAP software can be static-analyzed through only the source codes, thereby detecting the code defects, which can be generated in the actual execution, in advance.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a code inspection executing system for performing a code inspection of ABAP source codes capable of constituting tree data structure of an abstract syntax tree by analyzing the ABAP source codes in terms of vocabulary and syntax according to an ABAP grammar (BNF) defined in advance and establishing a table data structure of a symbol table by semantically analyzing it in the abstract syntax tree.

What is claimed is:

1. A code inspection executing system for Advanced Business Application Programming (ABAP) source codes, comprising:
    an ABAP source codes grammar analyzer implemented by a computer, analyzing the ABAP source codes in terms of vocabulary, syntax, and signification thereof and storing analysis results in a data structure of an abstract syntax tree and a symbol table; and
    an ABAP source codes defect checker implemented by the computer, generating a code defect report on a computer screen in order to check a code defect of a source code and a grammar structure and modify the code defect,
    wherein the ABAP source codes grammar analyzer implemented by the computer includes
        a lexical analysis module reading a file including the ABAP source codes as an object of code inspection and separating the ABAP source codes of the file into token units according to an ABAP grammar (BNF) defined in advance, the token units being a series of character string and including keyword, identifier, symbol identifier, constant, operator,
        a syntactic analysis module inspecting whether the syntax (grammar) of each token unit is in contravention of the ABAP grammar defined in advance, generating a grammar error message relating to the file on the computer screen if the token unit has a grammar error, or analyzing syntax structures of the token units and extracting a relationship of a control flow between the syntaxes structures if there is no grammar error,
        an abstract syntax tree storage processing module storing the relationship of a control flow extracted from the syntactic analysis module in the data structure of the abstract syntax tree,
        a semantic analysis module extracting, from the data structure of the abstract syntax tree, symbol patterns, a connection relationship between the symbol patterns and defective pattern structures corresponding to the symbol patterns for inspection, the symbol patterns including class, method, variable, type, function, event, dialog and processing block, and a symbol table storage processing module storing the information extracted from the semantic analysis module in the data structure of the symbol table, and wherein the ABAP source codes defect checker implemented by the computer includes an ABAP rule database storing coding rules of various categories, symbol patterns of each rule, a defective pattern structure of each rule and a fault condition of each rule, said categories including ABAP and SQL coding style, coding standard, architecture standard, SQL standard, run-time error and security vulnerability, a ABAP rule managing module selecting the coding rules from the ABAP rule database, searching symbol values of the symbol table corresponding to the symbol and the defective pattern structure related to the selected rules, extracting all grammatical structures and the source code corresponding to the searched symbol values from the data structure of the abstract syntax tree, and transmitting them to a program path analyzing module, the program path analyzing module inspecting the grammatical structures and the source code of each symbol value extracted from the ABAP rule managing module according to a program path pattern, the defective pattern structures and the fault condition of the selected rules, the program path pattern including one of control flow, control and data flow and control flow and call, a code defect report generating module generating the code defect report on the computer screen if there is any defect violating the selected code rule.

2. The code inspection executing system as claimed in claim 1, wherein the syntactic analysis module of the ABAP source codes grammar analyzer analyzes the syntax structures of the token units using a LR(1) parser algorithm, the LR(1) parser algorithm being a bottom-up syntax analysis.

3. The code inspection executing system as claimed in claim 1, wherein the syntactic analysis module of the ABAP source codes grammar analyzer further extracts a type information and a name connection relationship.

4. The code inspection executing system as claimed in claim 1, wherein in the ABAP source codes grammar analyzer, if an upper directory having the file is selected for an analysis of the ABAP source codes, all files located in a lower directory of the upper directory become the object of inspection, or if a specific file is selected, the specific file becomes the object of inspection.

5. The code inspection executing system as claimed in claim 1, wherein the coding rules in the ABAP rule database can be changed and added by the ABAP rule managing module.

* * * * *